United States Patent [19]

Hirschvogel et al.

[11] 4,216,266

[45] Aug. 5, 1980

[54] FLEXIBLE GRAPHITE SHEET MATERIAL TREATED WITH AN ALKALI METAL SALT CONTAINING AT LEAST ONE OF THE ELEMENTS CHROMIUM, MOLYBDENUM AND TUNGSTEN

[75] Inventors: Alfred Hirschvogel, Langweid; Ernst Freundlinger, Meitingen, both of Fed. Rep. of Germany

[73] Assignee: Sigri Elektrographit Gesellschaft mit beschrankter Haftung, Meitingen bei Augsburg, Fed. Rep. of Germany

[21] Appl. No.: 944,269

[22] Filed: Sep. 21, 1978

[30] Foreign Application Priority Data

Oct. 27, 1977 [DE] Fed. Rep. of Germany ....... 2748135

[51] Int. Cl.$^2$ .............................................. C01B 31/04
[52] U.S. Cl. ................... 428/408; 423/448; 423/460
[58] Field of Search ................ 428/408; 423/448, 460

[56] References Cited

U.S. PATENT DOCUMENTS

| 504,105 | 8/1893 | Corleis et al. | 428/408 |
|---|---|---|---|
| 1,566,409 | 12/1925 | Lavene | 428/408 |
| 2,417,702 | 3/1947 | Ramadanoff | 428/408 |
| 2,597,963 | 5/1952 | Winter | 428/408 |
| 2,685,542 | 8/1954 | Woodburn et al. | 428/408 |
| 3,713,865 | 1/1973 | Leeds | 423/448 |
| 4,075,114 | 2/1978 | Ishikawa et al. | 428/408 |
| 4,091,083 | 5/1978 | Hirschvogel et al. | 423/448 |

OTHER PUBLICATIONS

C. A. 87-174848.
C. A. 88-55478.
C. A. 88-64761.
C. A. 89-92104.
C. A. 90-59222.

*Primary Examiner*—James C. Cannon
*Attorney, Agent, or Firm*—Herbert L. Lerner

[57] ABSTRACT

A flexible graphite laminate produced by compacting expanded graphite having incorporated an alkali metal salt containing at least one of the elements chromium, molybdenum and tungsten. The alkali metal salt reduces the corrosive properties of the flexible graphite laminate. The alkali metal salt may be incorporated during or after manufacture of the flexible graphite laminate from graphite.

14 Claims, No Drawings

FLEXIBLE GRAPHITE SHEET MATERIAL TREATED WITH AN ALKALI METAL SALT CONTAINING AT LEAST ONE OF THE ELEMENTS CHROMIUM, MOLYBDENUM AND TUNGSTEN

BACKGROUND OF THE INVENTION

1. Field of the Invention

This invention relates to a flexible graphite laminate and more particularly refers to a new and improved flexible graphite laminate having reduced corrosive properties and method of producing it.

2. Description of the Prior Art

Flexible graphite laminate is a known, commercially used product, especially for packing and seals, made from graphite. The graphite is usually first treated with an oxidizing medium which is frequently an acid and an oxidizing agent. The product may be a graphite compound or graphite salt such as graphite-hydrogen sulfate. The graphite after treatment with the oxidizing medium is rapidly heated causing the volume of the graphite to materially increase producing a product termed expanded graphite. The expanded graphite is compacted or compressed to form shaped parts usually as thin sheet or thicker laminate structures, designated collectively as a flexible graphite laminate. The flexible graphite laminates have been found to be especially useful for seals and packing.

German Pat. No. 66,804 discloses that flexible graphite laminates can be produced by dipping flake-form natural graphite into a liquid oxidizing agent and subsequently heating it for a few seconds to a temperature of around 1000° C. During this treatment, the individual graphite particles expand to a considerable extent and may subsequently be compacted, for example by rolling or stamping, without the addition of a special binder, to form flexible sheet-form structures, for example thin sheets or thicker laminate-like structures. The temperature-resistant self-lubricating structure which is produced is impermeable to liquids and gases and used as a seal and packing in contact with different materials, such as metals, specifically steel and ferrous alloys.

It has been found that some types of steel undergo corrosion when in contact with such graphite laminates, the degree of corrosion being determined by the nature of the surrounding medium and by the type and quantity of the impurities present in the laminate. For example, chrome-nickel steels undergo corrosion in contact with graphite laminate when in fully deionised water, but not in normal tap water. Although the degree of corrosion can be reduced by purifying the graphite laminate, it is not possible completely to prevent corrosion, even when employing graphite with very low ash contents of less than 40 ppm. Furthermore, the purification of graphite laminates, for example treatment of the laminate with halogen-containing gases at an elevated temperature, is expensive and can adversely affect the properties of the laminate, such as its flexibility.

SUMMARY OF THE INVENTION

An object of the present invention is to provide a flexible graphite laminate having reduced corrosive properties. Another object of the invention is to provide an efficient method for producing a flexible graphite laminate with reduced corrosive properties.

With the foregoing and other objects in view, there is provided in accordance with the invention a flexible graphite laminate produced by compacting expanded graphite having incorporated in the laminate an alkali metal salt containing an element selected from the group consisting of chromium, molybdenum and tungsten.

In accordance with the invention, there is provided a process for the production of a flexible graphite laminate by treating graphite with a liquid containing an oxidizing agent and subsequently heating the treated graphite to expand the treated graphite to produce expanded graphite, and subsequently compacting the expanded graphite to form a flexible graphite laminate, the improvement including reducing the corrosive properties of the flexible graphite laminate by incorporating in the graphite subsequent to the oxidation treatment and during or after the manufacture of the laminate, an alkali metal salt containing an element selected from the group consisting of chromium, molybdenum and tungsten.

Other features which are considered as characteristic for the invention are set forth in the appended claims.

Although the invention is illustrated and described herein as embodied in flexible graphite sheet material, it is nevertheless not intended to be limited to the details shown, since various modifications may be made therein without departing from the spirit of the invention and within the scope and range of equivalents of the claims.

DETAILED DESCRIPTION OF THE INVENTION

The invention, however, together with additional objects and advantages thereof will be best understood from the following description and specific embodiments.

The flexible graphite laminate of this invention contains an alkali metal salt having one or more of the elements chromium, molybdenum and tungsten. The alkali metal salt in the graphite laminate is preferably the sodium salt. Sodium molybdate is particularly desirable since not only is it effective, but it also is a relatively inexpensive material. The salts are preferably present in the graphite laminate in the proportion of from 0.1 to 1.0% by weight of flexible graphite laminate.

The alkali metal salt having one or more of the elements, chromium, molybdenum and tungsten, such as an alkali metal salt of chromic acid, molybdic acid or tungstic acid, may be incorporated in the laminate either during or after the process for the production of a flexible graphite laminate, or may be incorporated in the graphite from which the laminate is produced. Incorporation in the graphite should desirably take place after the oxidation treatment to avoid destruction or loss of the alkali metal salt.

In one procedure for producing the graphite laminate, the corrosion inhibiting salts are mixed in powder form with expanded graphite particles and the mixture thus obtained is pressed to form sheets. In another process, the salts in powder-form are mixed with a graphite compound, such as graphite hydrogensulphate, and the resulting mixture is heated to form expanded graphite particles which is subsequently formed into flexible sheet-form structures. In a preferred method of operation, a flexible graphite laminate is dipped into an aqueous solution of an alkali metal salt having one or more elements of the the elements chromium, molybdenum and tungsten and then dried at elevated temperature, generally in the range of 100°–150°, to remove the water. Solutions containing approximately 1% by weight of the alkali metal salts have been found suitable. Strips of graphite laminate having a thickness of 0.5 mm and a bulk density of 0.7 g/cc will usually require an immersion time of from 0.5 to 1 minute.

The following examples illustrate the present invention:

A series of tests were carried out with discs of flexible graphite laminate prepared in accordance with the present invention by compacting expanded graphite to produce flexible graphite laminate and incorporating in the flexible graphite 0.15%, 0.12% and 0.10% by weight of sodium chromate, sodium molybdate and sodium tungstate. The discs were clamped between pairs of steel discs (whose potentially passivating surface layers had been removed beforehand by grinding) and the assemblies thus formed were suspended at room temperature in containers filled with deionised water. In a control experiment, also with containers filled with the deionised water, discs of graphite laminate containing no alkali metal salts were similarly tested. The conductivity of the deionised water itself amounted to less than 1 $\mu$S/cm and the suspension in the containers was continued for a test period of 14 days. The test specimens were then dried and examined under a microscope for signs of corrosion of the steel discs, the corrosive attack being quantitatively evaluated on the basis of a four-stage comparison scale comprising the number, size and depth of the corrosion zones. 0 signifies no corrosion, 3 very serious corrosion.

The test results obtained are recorded in the following table:

TABLE

| Material No. | Control (no alkali metal salt) | Sodium chromate | Sodium molybdate | Sodium tungstate |
|---|---|---|---|---|
| 1.4057 | 3 | 0[1] | 0[1] | 0[1] |
| 1.4550 | 3 | 0[2] | 0[2] | 0[2] |
| 1.4104 | 2 | 0[3] | 0[3] | 0[3] |
| 1.4401 | 1 | 0[3] | 0[3] | 0[3] |
| 1.4571 | 0 | 0[3] | 0[3] | 0[3] |

[1] salt content 0.15% by weight
[2] salt content 0.12% by weight
[3] salt content 0.10% by weight The same results were obtained in boiling water.

The temperature stability of the corrosion-inhibiting salts incorporated in the graphite laminates enables the flexible graphite laminates to be used reliably, for example for packings and seals of power station fittings which are exposed to temperatures of 400° C. and higher. In addition to containing the salt-like compounds, graphite laminates embodying this invention which are only to be used at low temperatures preferably additionally contain one or more water-soluble organic corrosion inhibitors, for example quinone derivatives, thiourea derivatives or diamine derivatives, in an amount of up to about 0.1% by weight. Such corrosion inhibitors show excellent stability under atmospheric conditions and effectively prevent corrosion, even after prolonged storage.

There is claimed:

1. A flexible graphite laminate produced by compacting expanded graphite having incorporated in the laminate an alkali metal salt containing an element selected from the group consisting of chromium, molybdenum and tungsten.

2. A flexible laminate according to claim 1, wherein the salt is a sodium salt.

3. A flexible graphite laminate as claimed in claim 1, wherein the alkali metal salt is a salt of an acid selected from the group consisting of chromic acid, molybdic acid and tungstic acid.

4. A flexible graphite laminate according to claim 2, wherein the salt is selected from the group consisting of sodium chromate, sodium molybdate and sodium tungstate.

5. A flexible graphite laminate according to claim 1 or claim 2 or claim 3 or claim 4, wherein the salt content in the flexible graphite laminate is from 0.1 to 1.0% by weight of the flexible graphite laminate.

6. A flexible graphite laminate according to claim 1, wherein the flexible graphite laminate has additionally incorporated at least one water-soluble organic inhibitor of corrosion of metal.

7. A flexible graphite laminate according to claim 6, wherein the organic corrosion inhibitor is selected from the group consisting of a quinone, a thiourea derivative and a diamine.

8. A flexible graphite laminate according to claim 6 or claim 7, wherein the flexible graphite laminate contains the organic corrosion inhibitor in an amount of up to 0.1% by weight of the flexible graphite laminate.

9. In a process for the production of a flexible graphite laminate by treating graphite with a liquid containing an oxidizing agent and subsequently heating the treated graphite to expand the treated graphite to produce expanded graphite, and subsequently compacting the expanded graphite to form a flexible graphite laminate, the improvement comprising reducing the corrosive properties of the flexible graphite laminate by incorporating in the graphite subsequent to the oxidation treatment and during or after the manufacture of the laminate, an alkali metal salt containing an element selected from the group consisting of chromium, molybdenum and tungsten.

10. A process according to claim 9, wherein the flexible graphite laminate is dipped into an aqueous solution of said alkali metal salt and subsequently dried.

11. A process according to claim 9, wherein the expanded graphite is admixed with the alkali metal salt in powder form and the mixture thus obtained pressed to form the flexible graphite laminate.

12. In a process for the production of a flexible graphite laminate by treating graphite particles with an oxidation agent to produce a graphite compound such as graphite-hydrogen sulfate, heating the graphite compound to form expanded graphite particles and subsequently compacting the expanded graphite particles to form a flexible graphite laminate, the improvement comprising reducing the corrosive properties of the flexible graphite laminate by mixing an alkali metal salt containing an element selected from the group consisting of chromium, molybdenum and tungsten, the salt being in powder form, with the graphite compound, heating the mixture to expand the graphite compound and compressing the mixture thereby obtained to form the laminate.

13. A process according to claim 9, wherein said salt is selected from the group consisting of sodium molybdate, sodium tungstate and sodium chromate.

14. A process according to claim 12, wherein said salt is selected from the group consisting of sodium molybdate, sodium tungstate and sodium chromate.

* * * * *